(12) United States Patent
Ishida

(10) Patent No.: US 8,025,465 B2  
(45) Date of Patent: Sep. 27, 2011

(54) CUTTING INSERT, CUTTING TOOL AND CUTTING METHOD USING THE SAME

(75) Inventor: Takuya Ishida, Higashiomi (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 12/994,627

(22) PCT Filed: Sep. 29, 2009

(86) PCT No.: PCT/JP2009/066934  
§ 371 (c)(1),  
(2), (4) Date: Feb. 1, 2011

(87) PCT Pub. No.: WO2010/035870  
PCT Pub. Date: Apr. 1, 2010

(65) Prior Publication Data  
US 2011/0135406 A1 Jun. 9, 2011

(30) Foreign Application Priority Data  
Sep. 29, 2008 (JP) .................... 2008-251198

(51) Int. Cl.  
*B23C 5/20* (2006.01)  
*B23C 5/22* (2006.01)

(52) U.S. Cl. .................. 407/114; 407/113; 407/115

(58) Field of Classification Search .......... 407/113, 407/114, 115, 116, 48, 61  
See application file for complete search history.

(56) References Cited

U.S. PATENT DOCUMENTS 3,574,911 A * 4/1971 Penoyar ............... 407/114  
3,636,602 A * 1/1972 Owen ................... 407/113  
(Continued)

FOREIGN PATENT DOCUMENTS

EP 315610 A2 * 5/1989  
(Continued)

OTHER PUBLICATIONS

Microfilm of the specification and drawings annexed to the request of Japanese Utility Model App No. 9616/1983 (Laid-open No. 116106/1984), Aug. 6, 1984, Toshiba Tungaloy Co, Ltd.

*Primary Examiner* — Jason Daniel Prone  
*Assistant Examiner* — Jennifer Swinney

(57) ABSTRACT

A cutting tool comprises: a first cutting insert having a first side surface for interconnecting a first upper surface and a first lower surface, a first cutting edge located at the intersection between the first upper surface and the first side surface, and a first groove section located in the first side surface and extending to the first upper surface so as to divide the first cutting edge; a second cutting insert having a second upper surface, a second side surface, a second cutting edge located at the intersection between the second upper surface and the second side surface, and a cutting edge reinforcing section located on the second upper surface at an end thereof which is positioned on the second cutting edge side; and a holder for mounting thereto the first cutting insert and the second cutting insert. The first cutting insert and the second cutting insert are mounted to the holder in such a manner that the first cutting edge and the second cutting edge are located on the outer peripheral side of the holder, that the first lower surface and the second upper surface are in proximity to each other, and that the rotation trajectories of the cutting edge reinforcing section and the first groove section are partially superposed on each other.

16 Claims, 11 Drawing Sheets

U.S. PATENT DOCUMENTS

| | | | | |
|---|---|---|---|---|
| 3,701,187 A | * | 10/1972 | Erkfritz | 407/46 |
| 3,875,631 A | * | 4/1975 | Malinchak | 407/113 |
| 3,922,766 A | * | 12/1975 | Malinchak | 407/40 |
| 4,068,976 A | * | 1/1978 | Friedline | 407/114 |
| 4,130,371 A | * | 12/1978 | Druxeis | 407/114 |
| 4,140,431 A | * | 2/1979 | Friedline et al. | 407/114 |
| 4,180,355 A | * | 12/1979 | Nanini | 407/113 |
| 4,248,553 A | * | 2/1981 | Kraemer | 407/114 |
| 4,681,486 A | * | 7/1987 | Hale | 407/114 |
| 4,867,616 A | * | 9/1989 | Jakubowicz | 407/58 |
| 4,936,719 A | * | 6/1990 | Peters | 407/42 |
| 5,059,070 A | * | 10/1991 | Baker | 407/114 |
| 5,085,542 A | * | 2/1992 | Nakayama et al. | 407/114 |
| 5,221,164 A | * | 6/1993 | Allaire | 407/113 |
| 5,549,424 A | * | 8/1996 | Bernadic et al. | 407/100 |
| 5,779,401 A | * | 7/1998 | Stallwitz et al. | 407/114 |
| 5,791,832 A | * | 8/1998 | Yamayose | 407/113 |
| 6,447,218 B1 | * | 9/2002 | Lagerberg | 407/114 |
| 6,632,051 B1 | * | 10/2003 | Wermeister | 407/114 |
| 6,862,966 B2 | * | 3/2005 | Knapp | 82/1.11 |
| 6,957,933 B2 | * | 10/2005 | Pachao-Morbitzer et al. | 407/11 |
| 7,008,145 B2 | * | 3/2006 | Astrakhan | 407/35 |
| 7,275,896 B2 | * | 10/2007 | Nudelman | 407/114 |
| 7,591,614 B2 | * | 9/2009 | Craig | 407/66 |
| 7,802,946 B2 | * | 9/2010 | Ishida | 407/113 |
| 2004/0240949 A1 | * | 12/2004 | Pachao-Morbitzer et al. | 407/11 |
| 2008/0260476 A1 | * | 10/2008 | Ishida | 407/114 |
| 2009/0188356 A1 | * | 7/2009 | Ishida | 83/53 |
| 2010/0092253 A1 | * | 4/2010 | Ishida | 407/42 |

FOREIGN PATENT DOCUMENTS

| | | | |
|---|---|---|---|
| GB | 2054427 A | * | 2/1981 |
| JP | 7-225908 | | 8/1995 |
| JP | 9-57519 | | 3/1997 |
| JP | 10-138031 | | 5/1998 |
| JP | 2002-52415 | | 2/2002 |
| JP | 2003-25135 | | 1/2003 |
| JP | 2006218617 A | * | 8/2006 |

* cited by examiner

CUTTING INSERT, CUTTING TOOL AND CUTTING METHOD USING THE SAME

TECHNICAL FIELD

The present invention relates to a cutting tool used for working a metal or the like.

BACKGROUND ART

Conventionally, there has been used a throw away type cutting tool structured such that a cutting insert having a cutting edge is installed to a holder.

As the cutting insert used in the cutting tool mentioned above, for example, in patent document 1, there is disclosed a cutting insert provided with a cutting edge which is positioned at an intersection of an upper surface and a side surface, and a groove portion which is provided on the side surface in such a manner as to divide the cutting edge. Divided cutting edges divided by the groove portion contribute to a reduction of a cutting resistance.

On the other hand, in the case of using the cutting insert having the divided cutting edges as mentioned above, since an uncut part is generated in a portion corresponding to the groove portion, in the workpiece, it is necessary to install a cutting insert having a different arrangement of the groove portion into the holder. Specifically, two kinds of cutting inserts are attached to the holder in such a manner that located at a position on a rotational locus of the groove portion of one cutting insert installed to the holder is a cutting edge of the other cutting insert.

However, in the cutting tool to which these cutting inserts are attached, a great load is applied to the cutting edge portion of the other cutting insert corresponding to the groove portion of one cutting insert. Therefore, the cutting edge portion tends to be chipped.

PRIOR ART PUBLICATION

Patent Publication

Patent Publication 1: Japanese Unexamined Patent Publication No. 07-225908

SUMMARY OF THE INVENTION

An object of the present invention is to provide a cutting tool and a cutting method which can suppress a chip of a cutting edge.

MEANS FOR SOLVING THE PROBLEM

A cutting tool in accordance with the present invention includes a first cutting insert, a second cutting insert, and a holder to which the first cutting insert and the second cutting insert are installed. The first cutting insert has a first side surface connecting a first upper surface to a first lower surface, a first cutting edge positioned at an intersection of the first upper surface and the first side surface, and a first groove portion positioned at the first side surface and reaching the first upper surface so as to divide the first cutting edge. On the other hand, the second cutting insert has a second side surface connecting a second upper surface to a second lower surface, a second cutting edge positioned at an intersection of the second upper surface and the second side surface, and a cutting edge reinforcement portion positioned at an end portion close to the second cutting edge on the second upper surface. Further, the first cutting insert and the second cutting insert are installed to the holder in such a manner that the first cutting edge and the second cutting edge are positioned at an outer peripheral side of the holder, the first lower surface and the second upper surface come close to each other, and a rotational locus of the cutting edge reinforcement portion and a rotational locus of the first groove portion overlap partly.

A cutting insert in accordance with the present invention is a reinforced type cutting insert for a cutting tool, which is installed to a holder together with a groove portion type cutting insert. The groove portion type cutting insert has a first side surface connecting a first upper surface to a first lower surface, a first cutting edge positioned at an intersection of the first upper surface and the first side surface, and a first groove portion positioned at the first side surface and reaching the first upper surface so as to divide the first cutting edge. On the other hand, the reinforced type cutting insert has a second side surface connecting a second upper surface to a second lower surface, a second cutting edge positioned at an intersection of the second upper surface and the second side surface, and a cutting edge reinforcement portion positioned at an end portion close to the second cutting edge in the second upper surface. Further, the groove portion type cutting insert and the reinforced type cutting insert are installed to the holder in such a manner that the first cutting edge and the second cutting edge are positioned on an outer peripheral side of the holder, the first lower surface and the second upper surface come close to each other, and the cutting edge reinforcing portion and the first groove portion are arranged at a corresponding position of a rotational locus of the holder.

A cutting method of a workpiece in accordance with the present invention includes a step of rotating the cutting tool, a step of bringing the cutting tool into contact with the workpiece, and a step of separating the workpiece from the cutting tool.

EFFECT OF THE INVENTION

In accordance with the cutting tool of the present invention, it is possible to suppress a chip of the cutting edge portion existing at the position corresponding to the groove portion of the first cutting insert, in the cutting edge of the second cutting insert.

MODE FOR CARRYING OUT THE INVENTION

A description will be in detail given below of an embodiment in accordance with the present invention with reference to the accompanying drawings.
<Cutting Tool>

First Embodiment

Figure 1:
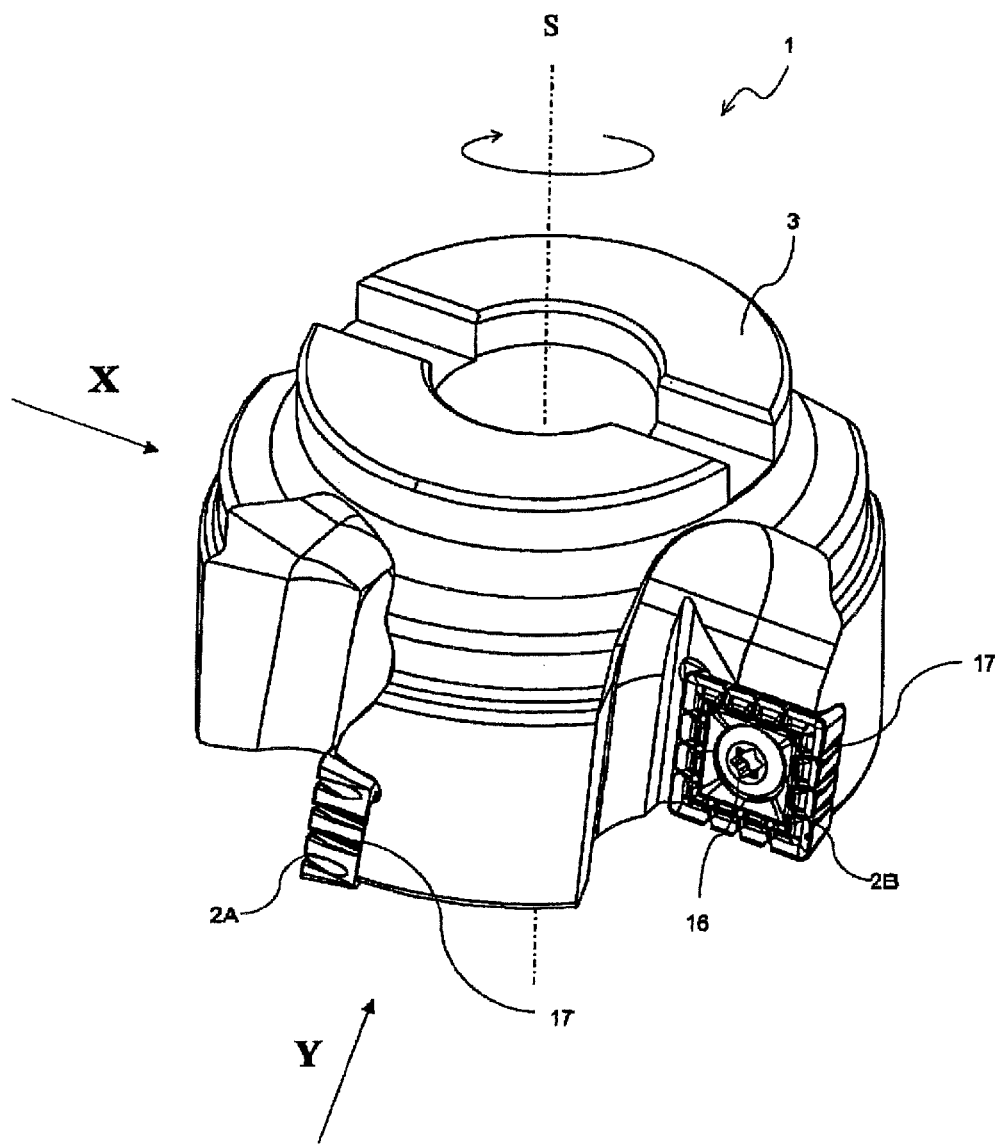
FIG. 1 is a general perspective view of a cutting tool 1 in accordance with a first embodiment of the present invention.

A cutting tool 1 in accordance with the present embodiment is provided with a holder 3, and a cutting insert 2 (hereinafter, abbreviated as insert 2) installed to the holder 3, as shown in FIG. 1.

The holder 3 is formed as an approximately rotating body shape around an axis S. Further, four insert pockets 17 are provided in a front end side of the holder 3. The insert pocket 17 is a portion to which the insert 2 is installed, and an outer peripheral surface and a front end surface of the holder 3 are open thereto.

At least two kinds of inserts (inserts 2A and 2B) having different shapes are installed to the holder 3. Specifically, two inserts 2A and two inserts 2B are installed to the holder 3. The inserts 2A and the inserts 2B are alternately arranged in a peripheral direction of the holder 3.

In the present embodiment, the insert 2 is installed to the insert pocket 17 by a fixing screw 16. That is, the insert 2 is installed to the holder 3 by inserting the fixing screw 16 to a through hole 15 mentioned below of the insert 2, and engaging a front end of the fixing screw 16 with a thread hole formed in the insert pocket 17.

The insert 2 is installed to the holder 3 further in such a manner as to have a positive axial rake. In accordance with the structure mentioned above, it is possible to achieve a reduction of a cutting resistance applied at a time of cutting.

Figure 2:
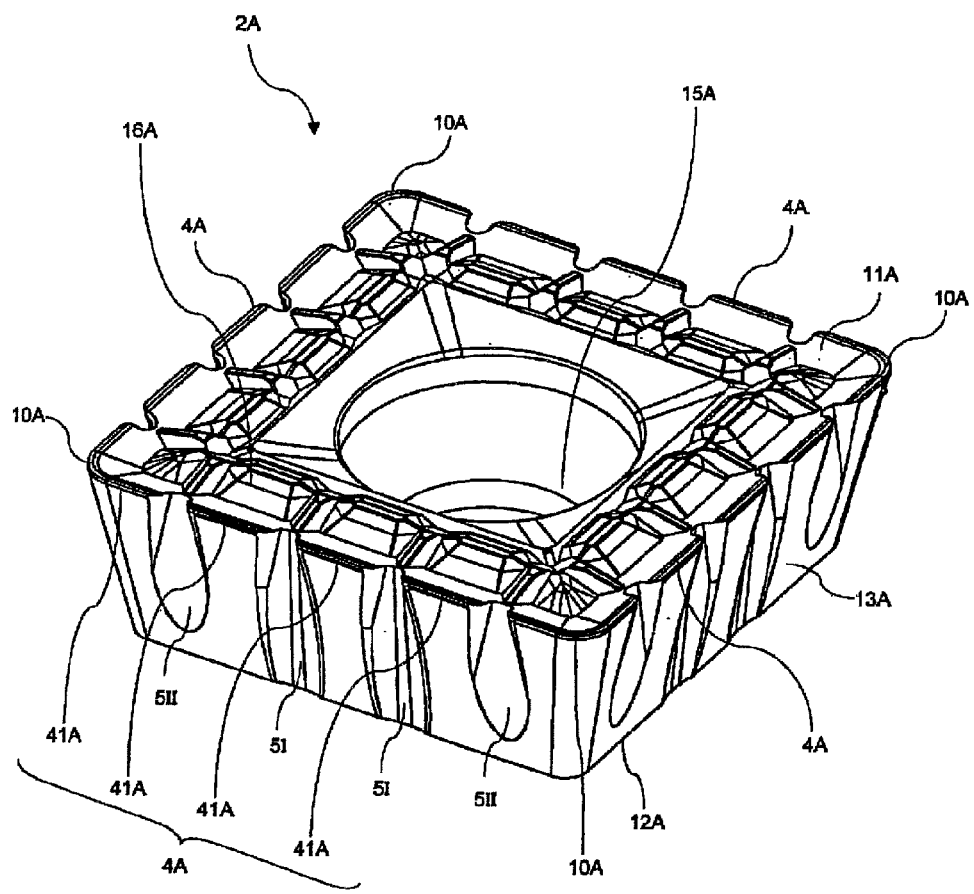
FIG. 2 is a general perspective view of a cutting insert 2A installed to the cutting tool in FIG. 1.
Figure 3A:
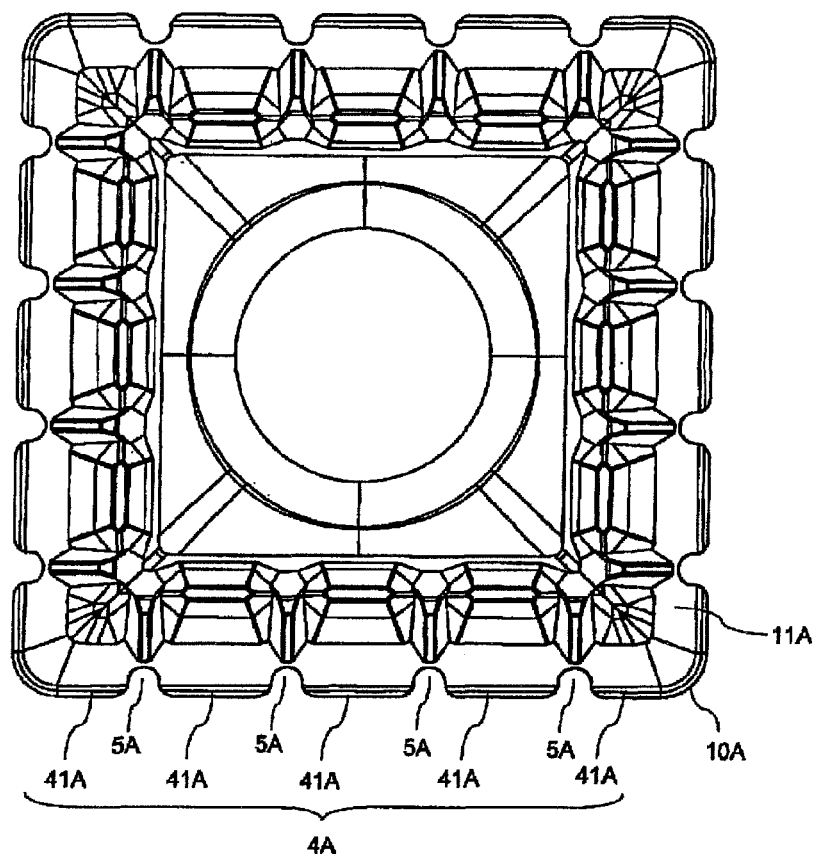
FIG. 3(a) is a plan view.

The insert 2A is provided with an upper surface 11A, a lower surface 12A and a side surface 13A connecting the upper surface 11A to the lower surface 12A, as shown in FIG. 2. Further, the insert 2A is provided with a cutting edge 4A which is provided on an intersection of the upper surface 11A and the side surface 13A. The upper surface 11A is formed as an approximately square shape having four corners 10A, as shown in FIG. 3(a), and the cutting edge 4A is arranged in each of sides of the upper surface 11A. In other words, the insert 2A is a so-called four-corner type insert having four cutting edges 4A. In this case, the insert 2A has a through hole 15A penetrating from the upper surface 11A to the lower surface 12A. Further, four cutting edges 4A are arranged in such a manner as to be rotationally symmetrical at 90 degree with respect to a center line of the through hole 15A.

Figure 3B:
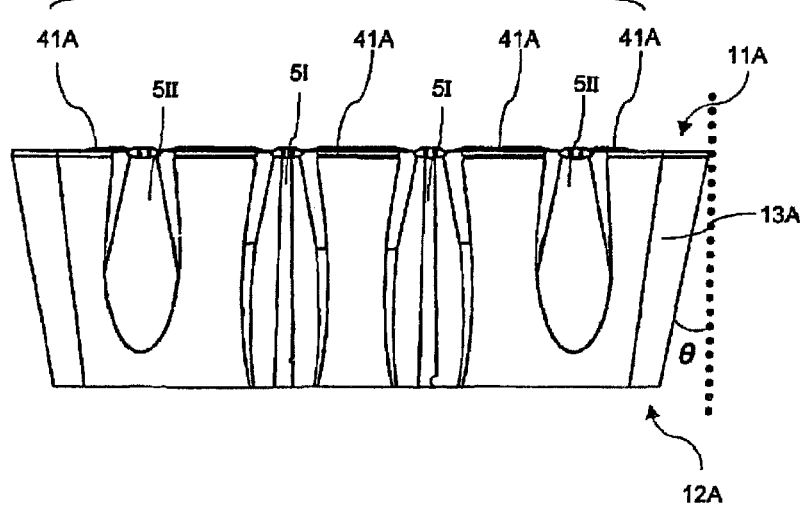
FIG. 3(b) is a side elevational view of the insert 2A in FIG. 2.

Further, the insert 2A has a groove portion 5A provided on the side surface 13A. The groove portion 5A reaches the upper surface 11A, and is provided in such a manner as to divide the cutting edge 4A into a plurality of small cutting edges 41A, as shown in FIGS. 2 and 3(b). Further, the groove portion 5A is formed in such a manner as to form an outward open concave shape in the top view, as shown in FIG. 3(a).

In the present embodiment, the cutting edge 4A is divided into five small cutting edges 41A by the groove portion 5A.

In the present embodiment, further, two groove portions 5I positioned at the center side among four groove portions 5A are provided from an end portion close to the upper surface 11A side to an end portion close to the lower surface 12A side on the side surface 13A. On the other hand, the remaining two groove portions 5II positioned close to the corner 10A side do not reach the end portion close to the lower surface 12A side on the side surface 13A, as shown in FIG. 3(b). Since the groove portions 5II mentioned above are provided at the corner side, it is possible to inhibit a strength from being lowered in the vicinity of the corner 10A of the insert 2A.

Further, a positive clearance angle is applied to the insert 2A in accordance with the present embodiment. The clearance angle in this case means an angle of gradient θ of the side surface 13 with respect to an auxiliary line which is approximately vertical to the lower surface 12A, in the side view, as shown in FIG. 3(b). In the present embodiment, the clearance angle θ is fixed in an area extending along the cutting edge 4.

Next, a description will be given of the insert 2B installed to the cutting tool 1 in accordance with the present embodiment with reference to FIGS. 4 and 5.

Figure 5A:
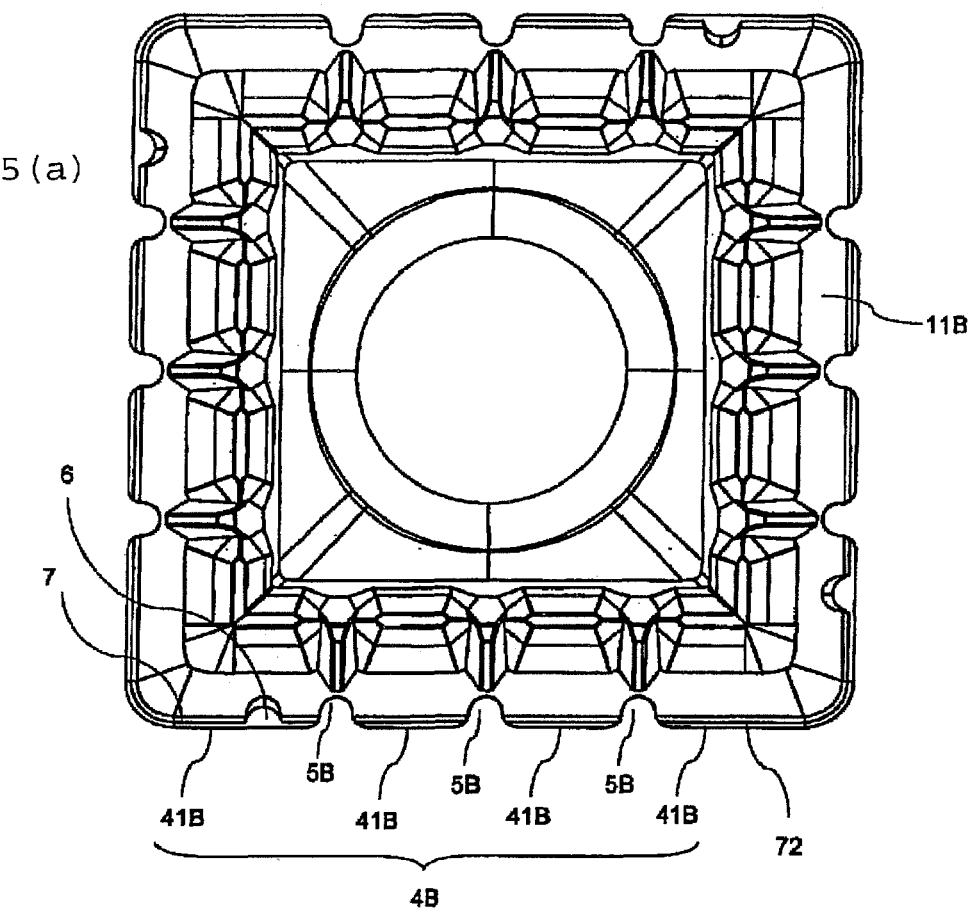
FIG. 5(a) is a plan view.

The insert 2B is provided with an upper surface 11B, a lower surface 12B, and a side surface 13B connecting the upper surface 11B to the lower surface 12B. Further, the insert 2B is provided with a cutting edge 4B which is provided at an intersection of the upper surface 11B and the side surface 13B, and a through hole 15B penetrating from the center of the upper surface 11B to the center of the lower surface 12B. As shown in FIG. 5(a), in the insert 2B, the upper surface 11B is formed as an approximately rectangular shape, and the cutting edge 4B is arranged on each of sides of the upper surface 11B. These four cutting edges 4B are arranged so as to be rotationally symmetrical at 90 degree with respect to a center line of the through hole 15B, in the same manner as the insert 2A.

Here, the insert 2B has a cutting edge reinforcing means 6 in the vicinity of the cutting edge 4B. The cutting edge reinforcing means 6 is provided at a position corresponding to the groove portion 5B of the insert 2A.

The cutting edge reinforcing means 6 is arranged for the purpose of suppressing a chip of the cutting edge 4B. Specifically, the cutting edge reinforcing means 6 is a protruding portion which is formed on the upper surface 11B and extends in an approximately vertical direction to the cutting edge 4B. Since the cutting edge reinforcing means 6 is arranged in the vicinity of the cutting edge 4B, a thickness in the vicinity of the cutting edge is increased, and it is possible to suppress the chip of the cutting edge 4B. In terms of a further suppression of the chip of the cutting edge 4B, it is preferable that the cutting edge reinforcing means 6 is formed continuously in the cutting edge 4B. The cutting edge reinforcing means 6 is provided, for example, on a rake face formed on the upper surface 11B or on a land.

Figure 6A:
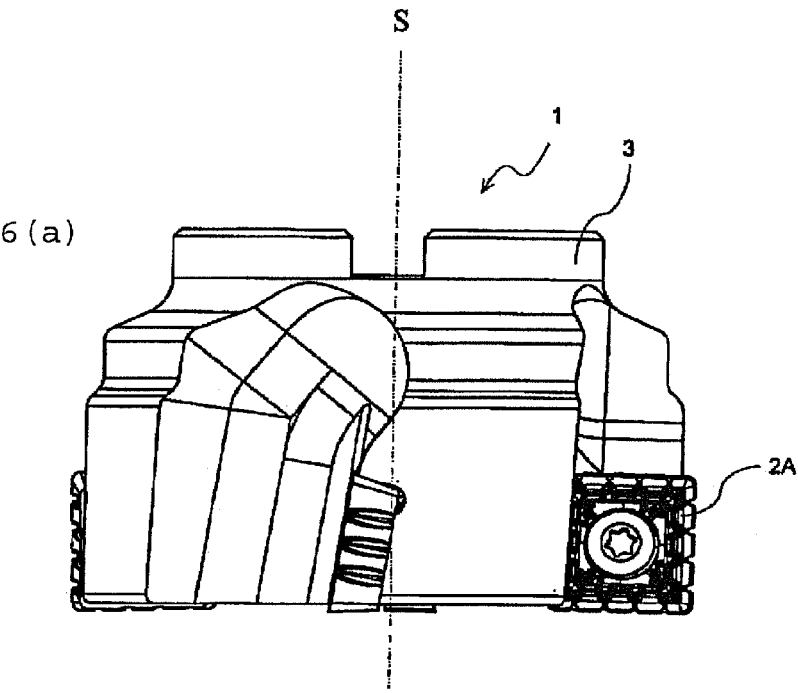
FIG. 6(a) is a side elevational view of the cutting tool 1 as seen from a direction X in FIG. 1.
Figure 6B:
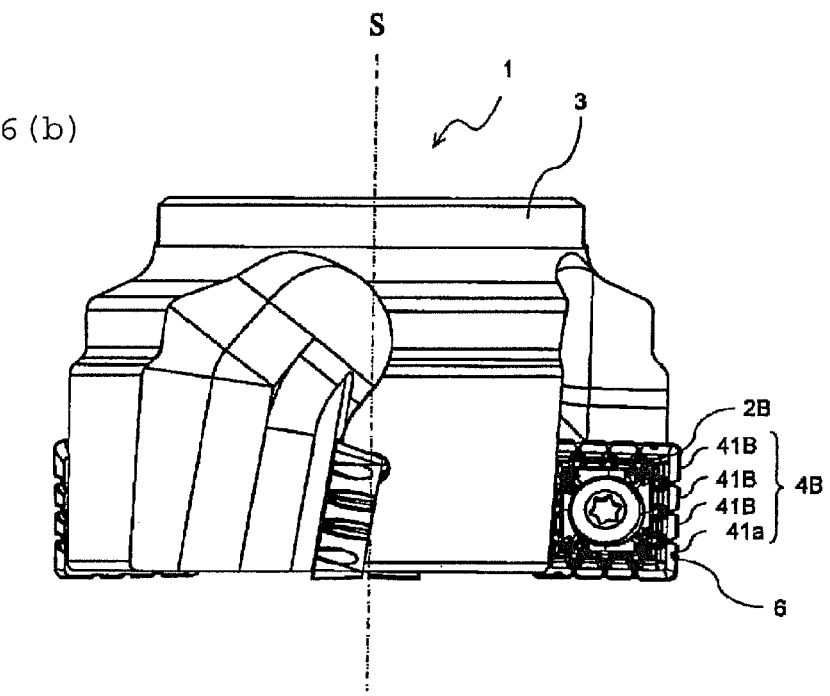
FIG. 6(b) is a side elevational view of the cutting tool 1 as seen from a direction Y in FIG. 1.

It is preferable that the cutting edge reinforcing means 6 is arranged in the vicinity of the small cutting edge 41a positioned at a front end side of the holder 3 among four small cutting edges 41 divided by the groove portion 5B, as shown in FIG. 6(b). That is, the cutting edge reinforcing portion 6 is positioned closer to the front end side of the holder 3 than one or more groove portions 5B. In accordance with the structure mentioned above, it is possible to keep a strength of the small cutting edge 41a coming into contact with the workpiece at the beginning.

Figure 7:
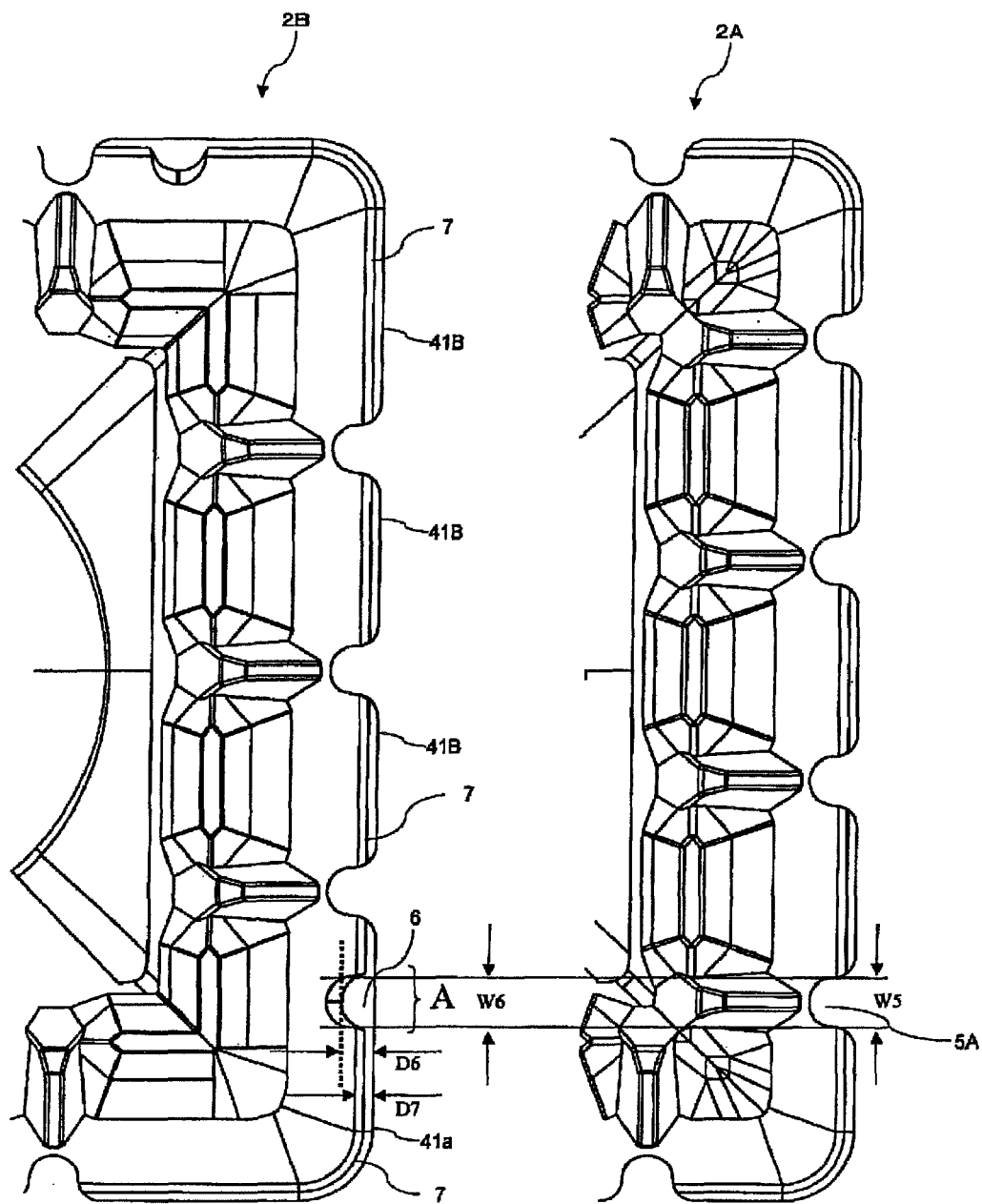
FIG. 7 is a schematic view illustrating a cutting state using the cutting tool 1, and respectively shows enlarged views of substantial parts of FIGS. 6(a) and 6(b) in parallel.

Further, in the present embodiment, the insert 2B has a land 7 which is provided along the cutting edge 4. In the case that the land 7 is arranged, the cutting edge reinforcing means 6 may be arranged continuously to the land 7. As shown in FIG. 7, in the case of setting a dimension of the cutting edge reinforcing means 6 in the approximately vertical direction to the cutting edge 4 to D6, and setting a dimension of the land 7 in the approximately vertical direction to the cutting edge 4 to D7, D6 and D7 have a relationship D6>D7. As mentioned above, in the present embodiment, the dimension D6 of the cutting edge reinforcing means 6 in which a substantial feeding amount is larger becomes larger than the dimension D7 of the land 7. Note that D6 means a maximum value of the dimension of the cutting edge reinforcing means 6 in the vertical direction to the cutting edge 4, as shown in FIG. 7. In the present embodiment, since the dimension becomes maximized in the center in an approximately parallel direction to the cutting edge 4B (a width direction), a value in the center is set to D6. D7 also means a maximum value of the dimension of the land 7 in the same manner as mentioned above.

In the present embodiment, further, as shown in FIG. 7, a width of the groove portion 5A close to the cutting edge 4A side is set to W5, in the insert 2A. Further, a width of the cutting edge reinforcing means 6 close to the cutting edge 4B side is set to W6, in the insert 2B. At this time, W5 and W6 are approximately identical. In this case, in the present specification, the width means a dimension in a direction extending along the cutting edge.

In accordance with the structure mentioned above, it is possible to improve a cutting edge strength while achieving a reduction of a cutting resistance.

Further, as shown in FIG. 7, the width W of the cutting edge reinforcing means 6 becomes smaller as it heads for an inner side. Specifically, in the present embodiment, the cutting edge reinforcing means 6 is formed as an approximately semicircular shape, in the top view. In accordance with the structure mentioned above, it is possible to achieve an improvement of a strength of the cutting edge reinforcing means 6 itself.

Figure 5B:
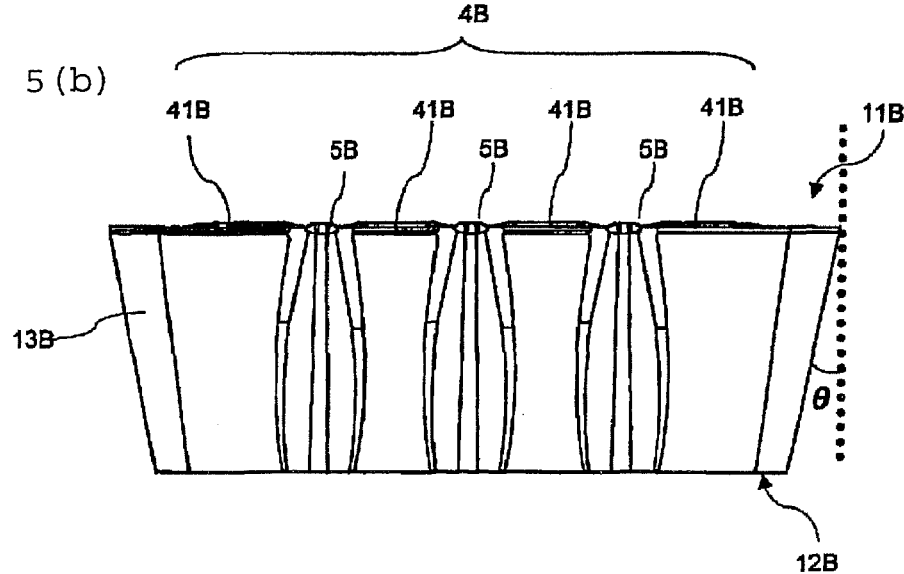
FIG. 5(b) is a side elevational view of the insert 2B in FIG. 3.

Further, in the present embodiment, as shown in FIG. 5(b), the cutting edge reinforcing means 6 and the land 7 are formed in such a manner that an angle of gradient with respect to the lower surface 12B becomes constant. In other words, in the present embodiment, the cutting edge reinforcing means 6 and the land 7 are constructed on the same plane. In accordance with the structure mentioned above, it is possible to achieve an improvement of a strength of the land 7 as a whole.

In this case, in the present embodiment, there is exemplified the embodiment in which the angles of gradient of the cutting edge reinforcing means 6 and the land 7 become constant, but the structure is not limited to this. The angles of gradient of the cutting edge reinforcing means 6 and the land 7 may be different from each other (not shown). For example, even in the case that the angle of gradient of the cutting edge reinforcing means 6 is smaller than the angle of gradient of the land 7, the effect mentioned above can be achieved.

Further, the cutting edge reinforcing means 6 may be structured so as to be protuberate upward as it heads for the inner side of the upper surface 11B. In other words, the cutting edge reinforcing means 6 may be structured so as to be inclined in such a manner as to be away from the lower surface 12B as it heads for the inner side of the upper surface 11B. Note that, in the case of the protuberate structure as mentioned above, as the cutting edge reinforcing means 6, for example, there can be listed up an approximately semicircular shaped structure protruding upward with respect to the land 7.

The insert 2B has the groove portion 5B dividing the cutting edge 4B, in the same manner as the insert 2A. The cutting edge 4B is divided into four small cutting edges 41B by three groove portions 5B. As mentioned above, since the insert 2B also has the groove portion 5B, it is possible to achieve a reduction of the cutting resistance. Here, in the present embodiment, they are arranged in such a manner that a rotational locus of the groove portion of the insert 2A does not lap over a rotational locus of the groove portion of the insert 2B, in the side view.

Figure 4:
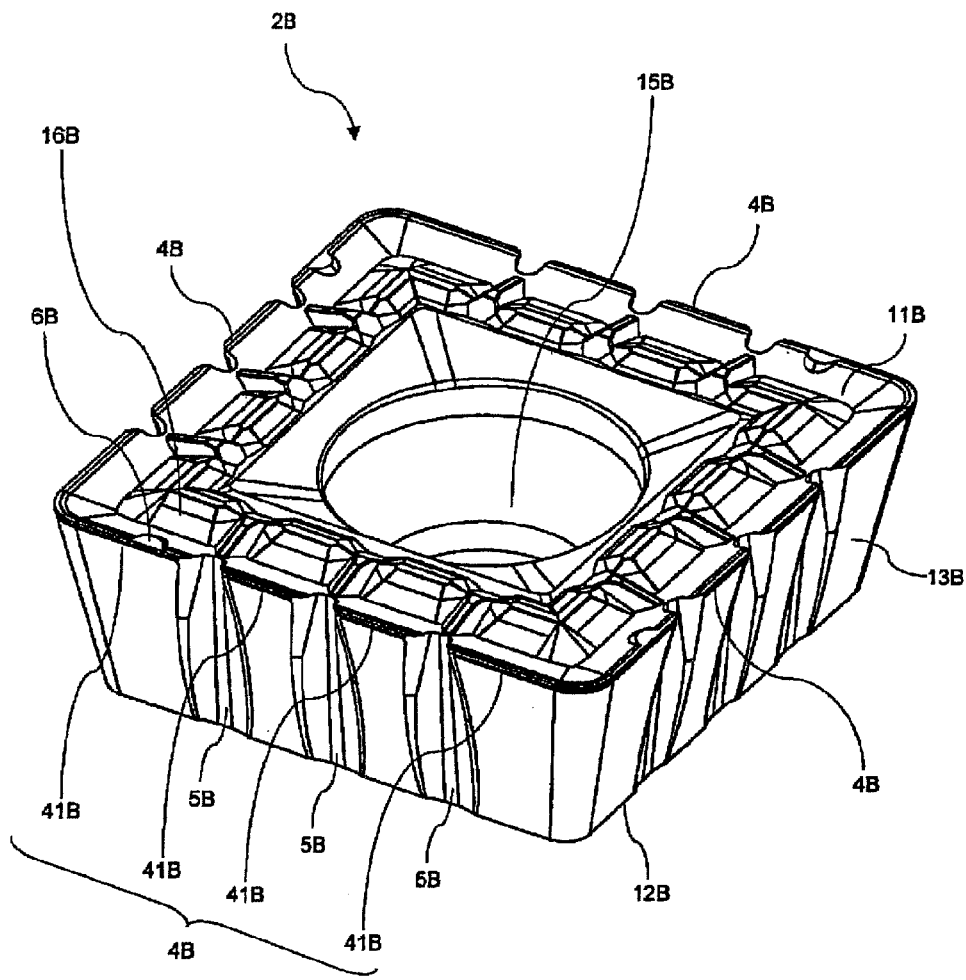
FIG. 4 is a general perspective view of a cutting insert 2B installed to the cutting tool in FIG. 1.

Further, as shown in FIGS. 2 and 4, both the insert 2A and the insert 2B have a projection portion 16 which is provided on the upper surface 11 in correspondence to the small cutting edge 41. Accordingly, a chip generated by the small cutting edge 41 is curled by the projection portion 16, and the chip is smoothly discharged. In this case, in the present embodiment, each of the projection portions 16 corresponding to a plurality of small cutting edges 41 is formed as approximately in the same shape. As a structure of the projection portion 16, for example, the structure of the projection portion 16 corresponding to the small cutting edge 41 in which a first land 7 forming the cutting edge reinforcing means 6 is provided may be different from the projection portion 16 corresponding to the other small cutting edge.

The cutting tool 1 is structured, as mentioned above, such that the inserts 2A and 2B are installed to the holder 3. FIG. 6(a) is a side elevational view of the cutting tool 1 as seen from a direction X in FIG. 1, and FIG. 6(b) is a side elevational view of the cutting tool 1 as seen from a direction Y in FIG. 1. The direction X here is a direction which is approximately vertical to an axis S of the holder 3, and a direction which heads for the lower surface 12A side from the upper surface 11A side of the insert 2A. Further, the direction Y here is a direction which is approximately vertical to the axis S of the holder 3, and a direction which heads for the lower surface 12B side from the upper surface 11B side of the insert 2B.

As shown in FIGS. 6(a) and 6(b), both the insert 2A and the insert 2B are arranged in the holder 3 in such a manner that the cutting edge 4A and the cutting edge 4B protrude from the outer peripheral surface of the holder 3. At this time, the cutting edge 4A and the cutting edge 4B are arranged along a direction of the axis S of the holder 3.

Further, the insert 2A and the insert 2B are arranged in such a manner that the lower surface 13A of the insert 2A and the upper surface 11B of the insert 2B come close to each other. In accordance with the arrangement mentioned above, a smooth work surface can be obtained by cutting an uncut portion of the work surface of the workpiece which is generated by the groove portion 5A provided on the insert 2A, by means of the cutting edge 4B of the insert 2B.

Specifically, since the insert 2A has the groove portion 5A, the portion corresponding to the groove portion 5A is left without being cut, on the work surface of the workpiece which is cut by the insert 2A. As a result, a band-like protuberant portion corresponding to the groove portion 5A exists on the work surface of the workpiece. The insert 2B cuts the work surface having the protuberant portion mentioned above.

Further, the insert 2A and the insert 2B are arranged in such a manner that a rotational locus of the groove portion 5A provided on the insert 2A partly laps over a rotational locus of the cutting edge reinforcing means 6 provided on the insert 2B. In accordance with the structure mentioned above, the protuberant portion of the work surface generated by the groove portion 5A can suppress the chip of the cutting edge 4B which may be generated at a time of coming into collision with the insert 2B. The rotational locus of the groove portion 5A and the rotational locus of the cutting edge reinforcing means 6 have a width in an axial direction of the holder, in the side view. Specifically, in the side view, these rotation loci may overlap partly or may be coincident.

FIG. 7 shows a cutting edge portion at a position corresponding to the groove portion 5A of the insert 2A in the cutting edge 4B of the insert 2B indicated by reference symbol A. The cutting edge portion A is a cutting edge portion which cuts the band-like protuberant portion corresponding to the groove portion 5A of the insert 2A on the work surface of the workpiece. A substantial feeding amount of the cutting edge portion A is larger than a substantial feeding amount of the other cutting edge portion. Specifically, the feeding amount of the cutting edge A cutting the protuberant portion corresponds to a total amount of the substantial feeding amount of the other cutting edge portion and a dimension at which the protuberant portion is protuberate upward. Accordingly, a greater load than the other cutting edge portion is applied to the cutting edge portion A cutting the protuberant portion.

Accordingly, in the present embodiment, as shown in FIG. 7, the cutting edge reinforcing means 6 is provided in the vicinity of the cutting edge portion A to which the greater load is applied. Specifically, the cutting edge reinforcing means 6 is provided at a position corresponding to the groove portion 5A of the insert 2A (that is, on the rotational locus of the groove portion of the installed insert 2A), in the vicinity of the cutting edge 4B. In accordance with the structure mentioned above, it is possible to improve a strength of the cutting edge portion of the insert 2B. As a result, it is possible to inhibit the cutting edge portion A from being chipped.

Second Embodiment

Figure 8A:
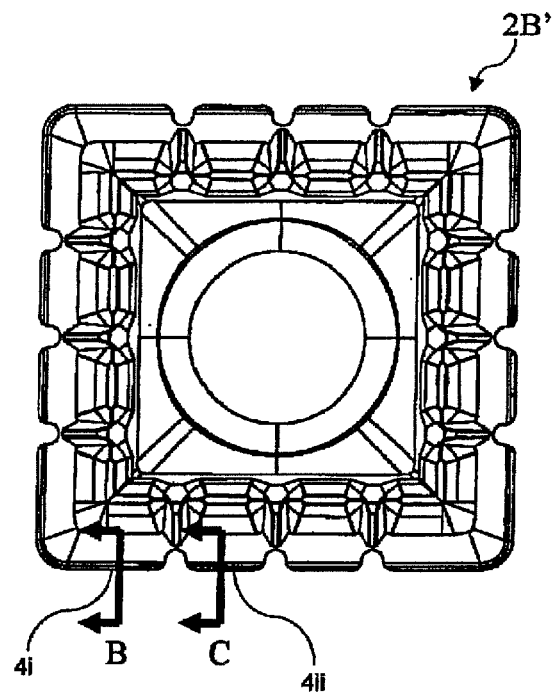
FIG. 8(a) is a plan view of a cutting insert 2B' installed to a cutting tool 1' in accordance with a second embodiment of the present invention.

An insert 2B' shown in FIG. 8 is another embodiment of the insert 2B installed to the cutting tool 1 in accordance with the first embodiment mentioned above.

In this case, the same reference numerals are attached to the same structures, as those of the insert 2B in the first embodiment and a description thereof will be omitted.

In the insert 2B' in accordance with the second embodiment, a structure of the cutting edge reinforcing means 6 is different from that of the insert 2B in accordance with the first embodiment. Specifically, the insert 2B' is structured such that a honing process is applied to the cutting edge 4B. The honing process means a process for improving the strength of the cutting edge 4B by grinding the cutting edge 4B with a grindstone or the like.

The cutting edge 4B of the insert 2B' has a first partial cutting edge 4i corresponding to the cutting edge reinforcing means 6, and second partial cutting edges 4ii positioned on both sides of the first partial cutting edge 4i. The first partial cutting edge 4i is positioned at a position corresponding to the groove portion 5A of the one insert 2A, in the direction of the axis S of the holder 3, in the cutting edge 4B.

Figure 8B:
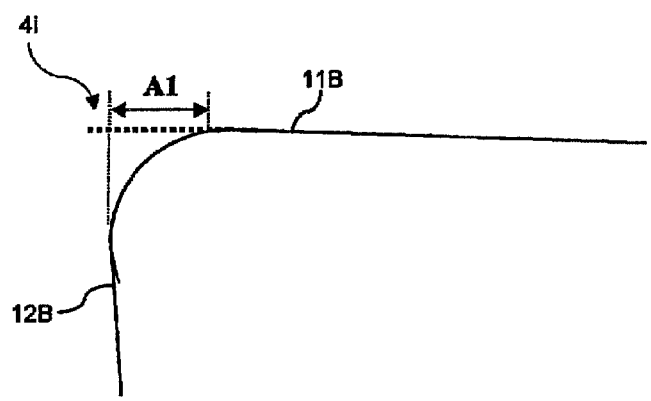
FIG. 8(b) is a cross sectional view along a line B-B.
Figure 8C:
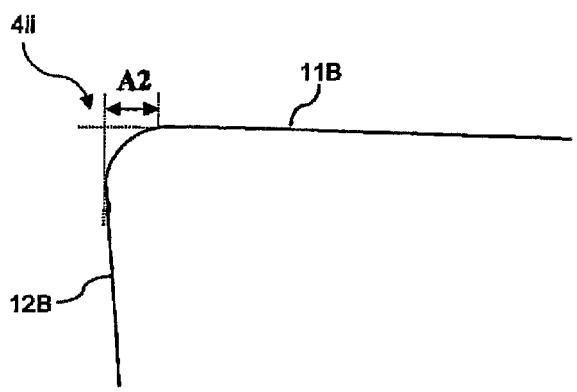
FIG. 8(c) is a cross sectional view along a line C-C in FIG. 8(a)

In the present embodiment, as shown in FIGS. 8(b) and 8(c), a honing amount of the first partial cutting edge 4i is larger than a honing amount of the second partial cutting edge 4ii. In other words, the honing process is applied more to the first partial cutting edge 4i than to the second partial cutting edge 4ii.

In accordance with the structure mentioned above, it is possible to enhance a strength of the first partial cutting edge 4i corresponding to the cutting edge portion of the insert 2B' to which the great load is applied at a time of cutting as mentioned above. Accordingly, it is possible to inhibit the cutting edge portion from being chipped.

Here, a honing amount A1 of the first partial cutting edge 4i means a distance which is approximately in parallel to the lower surface 12B, of a distance from an outer end portion of the upper surface 11B to an upper end of the side surface 13B, in the cross sectional view, as shown in FIG. 8(b). A honing amount A2 of the second cutting edge 4ii can be calculated in the same manner as the honing amount A1, as shown in FIG. 8(c).

Third Embodiment

Figure 9A:
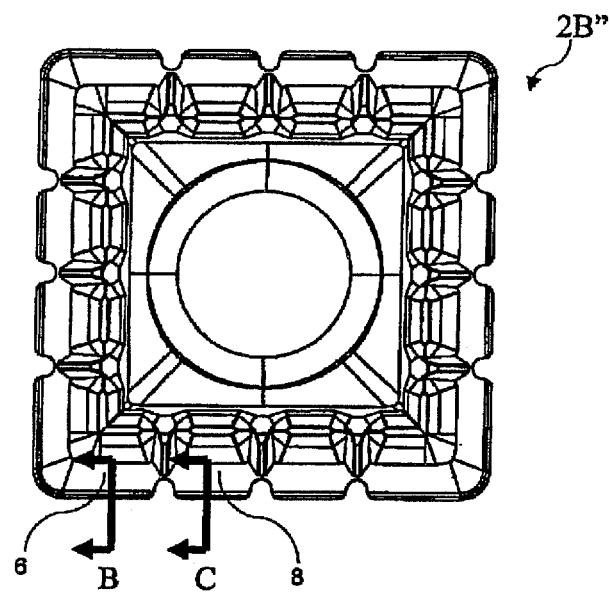
FIG. 9(a) is a plan view of a cutting insert 2B" installed to a cutting tool 1" in accordance with a third embodiment of the present invention.

An insert 2B" shown in FIG. 9 is another embodiment of the insert 2B installed to the cutting tool 1 in accordance with the first embodiment mentioned above.

In this case, the same reference numerals are attached to the same structures, as those of the insert 2B in the first embodiment and a description thereof will be omitted.

In the insert 2B" in accordance with the third embodiment, a structure of the cutting edge reinforcing means 6 is different from that of the insert 2B in accordance with the first embodiment.

Specifically, an upper surface 11B of the insert 2B" has a rake face 8 extending from the cutting edge 4B toward the center of the upper surface 11B. Here, in the present embodiment, the cutting edge reinforcing means 6 can be used as the rake face.

Figure 9B:
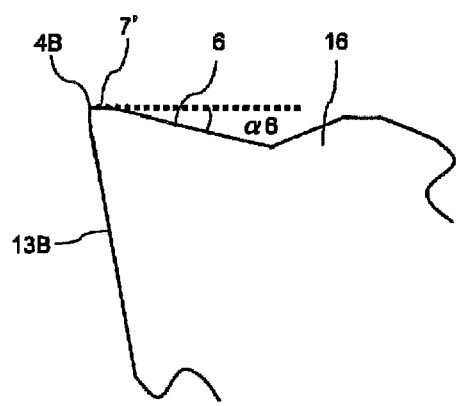
FIG. 9(b) is a cross sectional view along a line B-B.
Figure 9C:
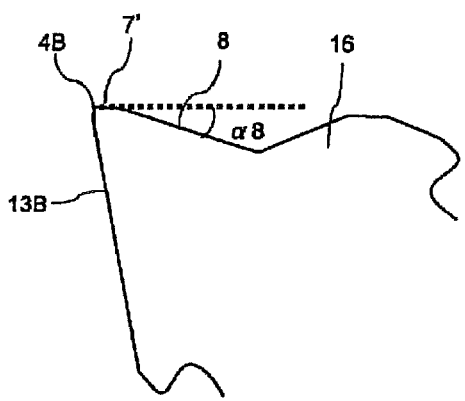
FIG. 9(c) is a cross sectional view along a line C-C in FIG. 9(a)

In the present embodiment, as shown in FIGS. 9(b) and 9(c), a rake angle $\alpha 6$ of the cutting edge reinforcing means 6 is smaller than a rake angle $\alpha 8$ of the rake surface 8.

In accordance with the structure mentioned above, it is possible to enhance a strength of the cutting edge portion to which the great load is applied at a time of cutting as mentioned above, in the cutting edge 4 of the insert 2B". Accordingly, it is possible to inhibit the cutting edge portion from being chipped.

In this case, the rake angle $\alpha 6$ of the cutting edge reinforcing means 6 is an angle of gradient of the cutting edge reinforcing means 6 with respect to the lower surface 12, as shown in FIG. 9(b). Further, the rake angle $\alpha 8$ of the rake surface 8 can be calculated in the same manner as the rake angle $\alpha 6$, as shown in FIG. 9(c).

In this case, in the present embodiment, as shown in FIGS. 9(b) and 9(c), a land 7' is provided along a whole periphery of the cutting edge 4.

Fourth Embodiment

Figure 10A:
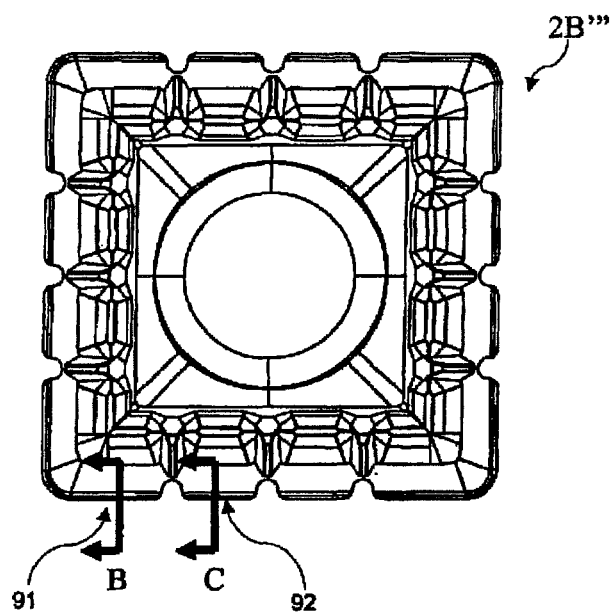
FIG. 10(a) is a plan view of a cutting insert 2B''' installed to a cutting tool 1''' in accordance with a fourth embodiment of the present invention.

An insert 2B''' shown in FIG. 10 is another embodiment of the insert 2B installed to the cutting tool 1 in accordance with the first embodiment mentioned above.

In this case, the same reference numerals are attached to the same structures, as those of the insert 2B in the first embodiment and a description thereof will be omitted.

In the insert 2B''' in accordance with the fourth embodiment, a structure of the cutting edge reinforcing means 6 is different from that of the insert 2B in accordance with the first embodiment.

Specifically, a side surface 13B of the insert 2B''' has a clearance 9 extending from the cutting edge 4B toward the lower surface 12B.

Further, the clearance 9 of the insert 2B''' has a first clearance 91 corresponding to the cutting edge reinforcing means 6, and second clearances 92 positioned on both sides of the first clearance 91.

Figure 10B:
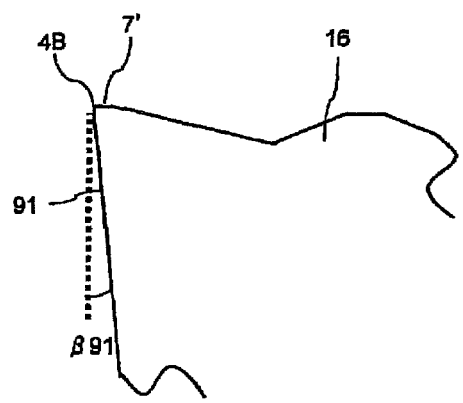
FIG. 10(b) is a cross sectional view along a line B-B.
Figure 10C:
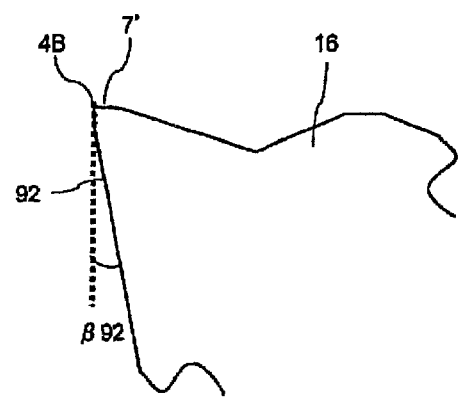
FIG. 10(c) is a cross sectional view along a line C-C in FIG. 10(a); and FIG. 11(a), FIG. 11(b), FIG. 11(c)

In the present embodiment, as shown in FIGS. 10(b) and 10(c), a clearance angle β91 of the first clearance 91 is smaller than a clearance angle β92 of the second clearance 92.

In accordance with the structure mentioned above, it is possible to enhance a strength of the cutting edge portion to which the great load is applied at a time of cutting as mentioned above, in the cutting edge 4B of the insert 2B'''. Accordingly, it is possible to inhibit the cutting edge portion from being chipped.

Here, the clearance angle β91 of the first clearance 91 is an angle of gradient of the first clearance 91 with respect to the lower surface 12B, as shown in FIG. 10(b). Further, the clearance angle β92 of the second clearance 92 can be calculated in the same manner as the clearance angle β91, as shown in FIG. 10(c).

In this case, in the present embodiment, a land 7' is provided along a whole periphery of the cutting edge 4 as shown in FIGS. 10(b) and 10(c), in the same manner as the insert 2B'' according to the third embodiment.

As mentioned above, in the insert installed to the cutting tool in accordance with four embodiments of the present invention, there is exemplified the insert in which the upper surface 11 is formed as the approximately rectangular shape as mentioned above; however, the structure is not limited to this, but may be made such that the upper surface may be formed as the other shapes such as a rhomboid shape, a triangular shape and the like. Note that, since it is possible to achieve a reduction of a working cost by having a plurality of cutting edges such as the present embodiment, the structure is desirable.

Further, in the inserts 2A and 2B in accordance with the embodiments mentioned above, there are exemplified the embodiments in which three or four groove portions 5 dividing the cutting edge 4 are formed, but the number of the groove portions 5 dividing the cutting edge 4 may be set to one or more.

Further, in the cutting tools in accordance with the embodiments mentioned above, there are exemplified the embodiments in which two kinds of inserts 2A and 2B are installed to the holder 3, but the structure is not limited to this. The kinds of the inserts 2 installed to the holder 3 may be two or more, and three or four kinds of inserts 2 may be installed to the holder 3.

In this case, in the embodiment mentioned above, the inserts 2A and 2B are installed directly to the insert pocket 17 of the holder 3, though the structure may be made such that the inserts 2A and 2B may be installed to the insert pocket 17 of the holder 3 via a seat member. In accordance with the structure mentioned above, in the case that the chip of the cutting edge 4 of the insert 2 or the like is generated, it is possible to reduce the chip of the holder 3 portion positioned at the chip portion of the cutting edge 4. Therefore, it is possible to elongate a service life of the holder 3.

In this case, in the embodiment mentioned above, there is exemplified the embodiment in which the insert 2 is installed to the holder 3 by the fixing screw 16; however, the structure is not limited to this, but may be made such that the insert 2 is installed to the holder 3 by another clamp mechanism.

Further, in the cutting tool in accordance with the embodiment mentioned above, the face mill cutter is exemplified; however, the present invention is not limited to this, but may be applied to various rolling tools such as an end mill, a side cutter and the like.

<Cutting Method>

Finally, a description will be given of a cutting method of a workpiece in accordance with an embodiment of the present invention with reference to FIGS. 11(a) to 11(d) by exemplifying the case that the rolling tool (the cutting tool 1) mentioned above is used.

A cutting method of the workpiece in accordance with the present embodiment includes the following steps (a) to (d).

Figure 11A:
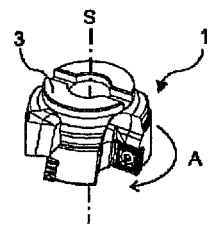
FIG. 11(d) is a process chart illustrating a cutting method of a workpiece in accordance with an embodiment of the present invention.

(a) a step of rotating the cutting tool 1 in a direction of an arrow A around the axis S of the holder 3, as shown in FIG. 11(a).

Figure 11B:
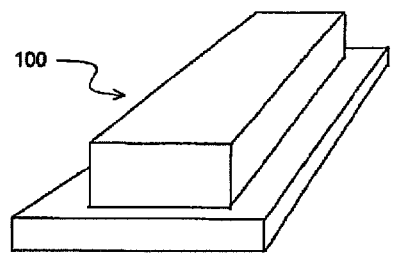

(b) a moving closer step of moving the cutting tool 1 close to a workpiece 100 by moving the cutting tool 1 in a direction of an arrow B, as shown in FIG. 11(b).

Figure 11C:
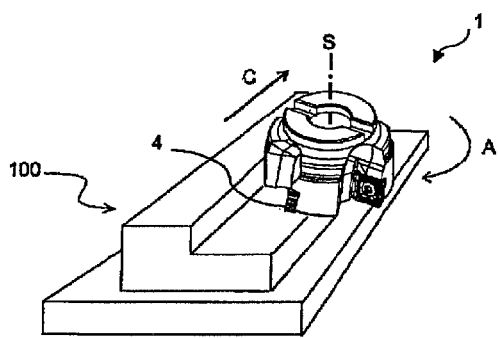

(c) a step of cutting a surface of the workpiece 100 by bringing the cutting edge 4 of the insert 2 into contact with the surface of the workpiece 100, and moving the cutting tool 1 in a direction of an arrow C, as shown in FIG. 11(c).

Figure 11D:
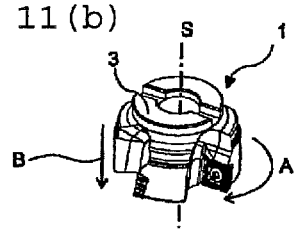
Figure 11D:
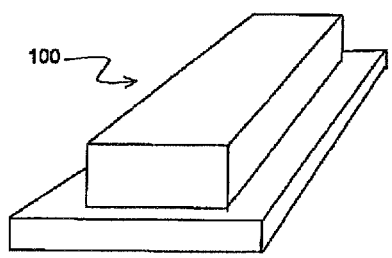
Figure 11D:
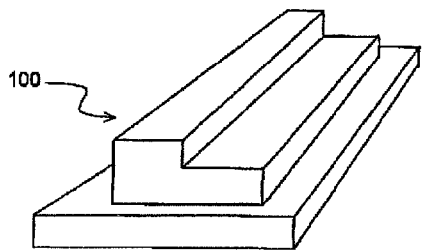

(d) a step of keeping the cutting tool 1 away from the workpiece 100 by moving the cutting tool 1 in a direction of an arrow D, as shown in FIG. 11(d).

Thus, since the excellent cutting edge strength is provided and the chip discharging property is provided, and the workpiece 100 is worked by using the cutting tool 1 having a long tool service life, as mentioned above, it is possible to achieve an improvement of a working efficiency and a finished surface precision. That is, it is possible to suppress the chip of the cutting tool 4. As a result, it is possible to stably carry out the cutting work having a high working precision for a long term.

In this case, in the step (a) mentioned above, at least one of the cutting tool 1 and the workpiece 100 may be rotated. Further, in the step (b) mentioned above, it is sufficient to relatively move the cutting tool 1 close to the workpiece 100, for example, the workpiece 100 may be moved close to the cutting tool 1. Likewise, in the step (d) mentioned above, it is sufficient to relatively keep the workpiece 100 away from the cutting tool 1 for example, the workpiece 100 may be kept away from the cutting tool 1. In the case of carrying over the cutting work, it is sufficient to repeat the step of bringing the cutting edge 4 of the insert 1 into contact with the different positions of the workpiece 100 while holding a state in which the cutting tool 1 and/or the workpiece 100 is rotated. When the cutting edge in use wears, an unused cutting edge is used by rotating the insert 2 at 90 degree around a center axis of the through hole 15.

The embodiments in accordance with the present invention are exemplified above; however, it goes without saying that the present invention is not limited to the embodiments, but may be optionally structured without departing from the purpose of the invention.

The invention claimed is:

1. A cutting tool, comprising:
   a first cutting insert comprising
      a first side surface connecting a first upper surface and a second lower surface,
      a first cutting edge located at an intersection of the first upper surface and the first side surface, and
      a first groove portion which is located on the first side surface, reaches the first upper surface, and divides the first cutting edge;
   a second cutting insert comprising
      a second side surface connecting a second upper surface and a second lower surface,
      a second cutting edge located at an intersection of the second upper surface and the second side surface,
      one or more second groove portions located at the second side surface, reaching the second upper surface, and dividing the second cutting edge,
      a land which is on the second upper surface and extends along the second cutting edge, and a cutting edge reinforcement portion located at an end portion closer to the second cutting edge on the second upper surface, wherein a length of the cutting edge reinforcement portion is longer than a length of the land, in a direction approximately vertical to the second cutting edge, and the cutting edge reinforcement portion comprises a protuberant portion which is located above the land as viewed from the side surface of the second cutting insert; and a holder configured to install the first cutting insert and the second cutting insert thereto, wherein the first cutting insert and the second cutting insert are installed to the holder, in such a manner that the first cutting edge and the second cutting edge are located at an outer peripheral side of the holder, the first lower surface and the second upper surface are opposed to each other, and a rotational locus of the cutting edge reinforcement portion and a rotational locus of the first groove portion overlap partly.

2. The cutting tool according to claim 1,
wherein the second cutting insert further comprises one or more second groove portions, the one or more second groove portions being located at the second side surface and reaching the second upper surface so as to divide the second cutting edge, and
wherein the cutting edge reinforcement portion is located closer to a front end side of the holder than the one or more second groove portions.

3. The cutting tool according to claim 1,
wherein a length of the second cutting edge side end portion of the cutting edge reinforcement portion in a direction approximately parallel to the second cutting edge is substantially identical to a length of the first cutting edge side end portion of the first groove portion in a direction approximately parallel to the first cutting edge.

4. The cutting tool according to claim 3, wherein a length of the cutting edge reinforcement portion in a direction approximately parallel to the second cutting edge becomes smaller as approaching an inner side of the second upper surface.

5. The cutting tool according to claim 3, wherein an angle of gradient of the cutting edge reinforcement portion with respect to the second lower surface is smaller than an angle of gradient of the land with respect to the second lower surface.

6. The cutting tool according to claim 1,
wherein the second cutting insert further comprises a rake face extending from the second cutting edge side toward the inner side on the second upper surface, and
wherein a rake angle of the rake face is larger than a rake angle of the cutting edge reinforcement portion.

7. A set of cutting inserts comprising a groove portion cutting insert, and a reinforced cutting insert for a cutting tool, which are both installed to a holder, wherein the groove portion cutting insert comprises
a first side surface connecting a first upper surface and a first lower surface,
a first cutting edge located at an intersection of the first upper surface and the first side surface, and
a first groove portion which is located on the first side surface, reaches the first upper surface, and divides the first cutting edge,
wherein the reinforced cutting insert comprises
a second side surface connecting a second upper surface and a second lower surface,
a second cutting edge located at an intersection of the second upper surface and the second side surface, and
one or more second groove portions located at the second side surface, reaching the second upper surface, and dividing the second cutting edge,
a land which is on the second upper surface and extends along the second cutting edge, and
a cutting edge reinforcement portion located at an end portion closer to the second cutting edge on the second upper surface, wherein a length of the cutting edge reinforcement portion is longer than a length of the land, in a direction approximately vertical to the second cutting edge, and the cutting edge reinforcement portion comprises a protuberant portion which is located above the land as viewed from the side surface of the second cutting insert, and
wherein the groove portion cutting insert and the reinforced insert are installed to the holder, in such a manner that the first cutting edge and the second cutting edge are located on an outer peripheral side of the holder, the first lower surface and the second upper surface are opposed to each other, and the cutting edge reinforcing portion and the first groove portion are located corresponding to a rotational locus of the holder.

8. The set of cutting inserts according to claim 7, further comprising a second groove portion which is located on the second side surface, reaches the second upper surface, and divides the second cutting edge,
wherein the cutting edge reinforcement portion is located closer to a front end side of the holder than the second groove portion.

9. The set of cutting inserts according to claim 7,
further comprising a land which is on the second upper surface and extends along the second cutting edge,
wherein a length of the cutting edge reinforcement portion is longer than a length of the land, in a direction approximately vertical to the second cutting edge.

10. The set of cutting inserts according to claim 7,
wherein a length of the cutting edge reinforcement portion in a direction approximately parallel to the second cutting edge becomes smaller as approaching an inner side of the second upper surface.

11. A method for cutting a workpiece, comprising:
rotating a cutting tool;
bringing the cutting tool into contact with the workpiece; and
separating the workpiece relatively from the cutting tool;
wherein the cutting tool comprises:
a first cutting insert comprising
a first side surface connecting a first upper surface and a second lower surface,
a first cutting edge located at an intersection of the first upper surface and the first side surface, and
a first groove portion which is located on the first side surface, reaches the first upper surface, and divides the first cutting edge;
a second cutting insert comprising
a second side surface connecting a second upper surface and a second lower surface,
a second cutting edge located at an intersection of the second upper surface and the second side surface,
one or more second groove portions located at the second side surface, reaching the second upper surface, and dividing the second cutting edge,
a land which is on the second upper surface and extends along the second cutting edge, and
a cutting edge reinforcement portion located at an end portion closer to the second cutting edge on the second upper surface, wherein a length of the cutting edge reinforcement portion is longer than a length of the land, in a direction approximately vertical to the second cutting edge, and the cutting edge reinforcement portion comprises a protuberant portion which is located above the land as viewed from the side surface of the second cutting insert; and a holder configured to install the first cutting insert and the second cutting insert thereto, wherein the first cutting insert and the second cutting insert are installed to the holder, in such a manner that the first cutting edge and the second cutting edge are located at an outer peripheral side of the holder, the first lower surface and the second upper surface are opposed to each other, and a rotational locus of the cutting edge reinforcement portion and a rotational locus of the first groove portion overlap partly.

12. The cutting method according to claim 11,
wherein the second cutting insert further comprises one or more second groove portion, the one or more second groove portion being located at the second side surface and reaching the second upper surface so as to divide the second cutting edge, and
wherein the cutting edge reinforcement portion is located closer to a front end side of the holder than the one or more second groove portions.

13. The cutting method according to claim 11, wherein a length of the second cutting edge side end portion of the cutting edge reinforcement portion in a direction approximately parallel to the second cutting edge is substantially identical to a length of the first cutting edge side end portion of the first groove portion in a direction approximately parallel to the first cutting edge.

14. The cutting method according to claim 13, wherein a length of the cutting edge reinforcement portion in a direction approximately parallel to the second cutting edge becomes smaller as approaching an inner side of the second upper surface.

15. The cutting method according to claim 13, wherein an angle of gradient of the cutting edge reinforcement portion with respect to the second lower surface is smaller than an angle of gradient of the land with respect to the second lower surface.

16. The cutting method according to claim 11, wherein the second cutting insert further comprises a rake face extending from the second cutting edge side toward the inner side on the second upper surface, and
wherein a rake angle of the rake face is larger than a rake angle of the cutting edge reinforcement portion.

* * * * *